Aug. 9, 1960 W. SWAROFSKY 2,948,206
PHOTOGRAPHIC REFLEX CAMERA
Filed June 25, 1957

INVENTOR
WALTER SWAROFSKY
BY Mocen Blum
ATTORNEYS

United States Patent Office 2,948,206
Patented Aug. 9, 1960

2,948,206
PHOTOGRAPHIC REFLEX CAMERA

Walter Swarofsky, Braunschweig, Germany, assignor to Voigtlander A.G., Braunschweig, Germany, a corporation of Germany Filed June 25, 1957, Ser. No. 667,744

Claims priority, application Germany July 7, 1956

5 Claims. (Cl. 95—64)

This invention relates to one-eye photographic reflex cameras and it has particular relation to cameras of this type, provided with exchangeable objectives and a device for preselected adjustment of the diaphragm.

It has been known that, in the use of devices for preselected adjustment of the diaphragm, the diaphragm value selected for a photographic picture taking can be adjusted without moving thereby the diaphragm lamellae, so that the diaphragm remains completely opened and the finder image can be observed at maximum brightness. The diaphragm is not closed to the selected value until the photographic picture is taken. In some of the known constructions of this type, this closing of the diaphragm is effected by hand, whereby the diaphragm adjusting ring is turned until it comes in contact with a stop of preselected adjustment. It has also been known to derive the closing movement of the diaphragm from the movement of a camera organ, e.g. the release key, upon the operation of which the diaphragm is automatically closed until it reaches the preselected value. Constructions have been known in which the diaphragm is automatically fully reopened after a photographic picture has been taken, so that the view finder image can be always observed at maximum brightness.

The devices for preselected adjustment of the diaphragm are usually built-in in the objective mount, or are structurally connected therewith. If the objective can be removed from the camera, i.e. in the case of so-called exchangeable objectives, each of the latter contemplated for a certain camera must contain a particular built-in device for preselected adjustment of the diaphragm, which means increased production costs for each exchangeable objective. Furthermore, in these constructions difficulties are encountered if the member which is provided on the exchangeable objective for preselected adjustment and setting of the diaphragm, is supposed to be adapted to be coupled, in the meaning of an exposure value adjustment, with a member for adjustment of the shutter times, which stays in the camera. The bringing about, as well as the release, of such couplings during an exchange of the objective, requires coupling elements of particular design, particularly in the case of long-focus objectives, in which said elements must bridge over a long distance between the adjustable members to be coupled, so that they are exposed to damage to an increased extent.

According to the present invention the above described difficulties are eliminated. In carrying out this invention, in a photographic camera of the above mentioned type the device for the preselected adjustment of the diaphragm, which is fixedly built in in the camera, is adapted to be connected with the diaphragm located in the exchangeable objective by means of transmission members which extend and act substantially in the direction of the optical axis. These power transmission organs extend preferably in the interior of the objective mount.

Thus, according to the present invention only a single device for preselected adjustment of the diaphragm is present for all exchangeable objectives contemplated to be used in a camera. There are no handle members for preselection or adjustment of the diaphragm on the mount of the exchangeable objectives so that the mount can be designed as a simple, smooth body. The handle member for preselection of the diaphragm is arranged on the camera body so that its coupling with the member for adjustment of the camera shutter times, within the meaning of exposure value adjustment, can be carried out in a simple, conventional manner.

A known device for preselected adjustment of the diaphragm consists of a closed unit to be built in in a camera body laterally of the objective. However, in this case the objective is likewise fixedly connected with the camera body. Thereby, a toothed rim provided on the diaphragm adjusting member of the objective mount, meshes with a pinion of the device for preselection of the diaphragm. In this construction the objective cannot be rendered exchangeable, because in order to obtain proper operation, the toothed rim and the pinion must engage each other in a specific manner. In contrast to this, the power transmission members provided according to the present invention, which extend in the interior of the objective mount between the diaphragm and the device for preselection of the diaphragm, permit exchange of the objective in a simple manner. By their particular location, said transmission members are also protected from damage.

According to the present invention, the adjusting handle member for the preselection of the diaphragm preferably consists of a ring which is arranged co-axially relative to the time adjusting ring of the shutter. Both rings can be arranged co-axially relative to the optical axis of the objective and capable of being coupled with each other in the meaning of an exposure value adjustment. Thereby, the time adjusting ring can be the adjusting member for a central shutter as well as a focal-plane shutter. It has been known, by itself, to arrange the time adjusting ring of a focal-plane shutter co-axially relative to the optical axis of the picture-taking objective. The coupling additionally contemplated in the meaning of exposure value adjustment according to the present invention, between the ring for preselection of the diaphragm and the ring for adjustment of the shutter times, has particular advantages because these two adjusting members can be coupled, according to this arrangement, at a predetermined exposure value, with each other and then displaced in any desired manner, whereby the diaphragm proper is not opened or closed. Thus, the brightness of the finder image does not change when the exposure values are adjusted. This is a distinguishing feature of the coupling according to the present invention in comparison with conventional devices for exposure value coupling devices, in which the member for adjusting shutter times and the member for adjusting the diaphragm are capable of being coupled with each other. In the latter, any adjustment of the exposure value results simultaneously in an adjustment of the diaphragm and in the case of couplings at certain exposure values it may not be possible to open the diaphragm to its maximum value. In the device according to the present invention, the coupling members between the ring for preselection of the diaphragm and the ring for adjustment of shutter times can be of any desired design.

In order to render the beforementioned transmission organs between the ring arranged in the camera body, for preselection of the diaphragm and the diaphragm located in the exchangeable objective, capable of being separated and connected with each other in a simple manner during exchange of objectives, it has been found to be of advantage to provide the ring for preselection of the diaphragm with a control cam, with which a feeler or scanning member is brought in engagement for the purpose of adjusting the diaphragm, whereby this scanning or feeler member adjusts the diaphragm to a smaller or greater extent, depending on its scanning position, over intermediate members which are displaceable in the direction of the optical axis of the picture-taking objective.

The diaphragm is held in open position by spring effect and its closing is carried out against this effect. As already mentioned above, it has been known to connect the diaphragm with a camera organ which moves during exposure, in such a manner that the diaphragm is closed to the pre-adjusted value only during the exposure period, while it is fully open prior to and after exposure. According to an advantageous embodiment of the present invention, it is contemplated that the beforementioned scanning member be connected with the shutter release member and be movable by it in such a manner that the scanning member will engage the control cam of the ring for preselection of the diaphragm only during the period of actuation of the shutter release key. Thus, the diaphragm will be adjusted to the preselected value only for the period of actuating the shutter release key. However, instead of the shutter release key, another camera organ which moves upon release of the shutter can be used for operation of the device for closing the diaphragm. According to an advantageous embodiment, the scanning or feeler member is tiltably fastened to a preferably two-armed lever which can be caused to move by the shutter release key, whereby the control cam fastened to the ring for preselection of the diaphragm is located in the range of movement of one arm of the scanning member and another arm of the scanning member lies against a scanning or feeler pin which is axially displaceably arranged in the camera body. This pin is in connection with a pin for adjusting the diaphragm, which is axially displaceably arranged in the objective mount and lies against an inclined surface provided on the ring for adjustment of lamellae of the iris diaphragm.

If the exchangeable objectives contemplated for the camera have differing strengths of illumination, care must be taken that the ring for preselection of the diaphragm, which is arranged in the camera and is supposed to be used for all objectives adapted to be alternately inserted in the camera, should not be adjustable to diaphragm values, to which the diaphragm of an objective, to be attached to the camera, is not adjustable. Thus, if the objective of highest strength of illumination has an aperture ratio of 1:2 so that the ring for preselection of the diaphragm is adjustable to the diaphragm value "2," such adjustment must be prevented if another objective having an aperture ratio of 1:4 has to be inserted in the camera. According to an advantageous modification of the invention, the mount of each exchangeable objective is, therefore, provided with a stop member in such a manner that upon application of the objective to the camera said pin projects into the range of movement of a stop or limiting flap connected with the ring for preselection of the diaphragm and thereby limits the range of movement of the diaphragm adjusting ring. In this manner it is attained not only that the ring for preselection of the diaphragm is adjustable only to the diaphragm value corresponding to the strength of illumination of the exchangeable objective inserted in the respective case, but it is simultaneously prevented to insert an exchangeable objective in the camera when the ring for preselection of the diaphragm is adjusted to a diaphragm value, to which the diaphragm of the respective exchangeable objective is not adjustable. Thus, insertion of an exchangeable objective having an aperture ratio of 1:4 is prevented if the ring for preselection of the diaphragm is adjusted for example to a diaphragm value of "2.8." However, insertion of said objective is possible if the ring for preselection of the diaphragm is adjusted to the diaphragm value "5.6," or "8," or "11."

The coupling between the ring for preselection of the diaphragm and the ring for adjustment of the shutter times can be of any desired construction. For example, elastic arms can be provided which connect the two rings with each other. However, it is also possible to arrange the shutter time adjusting ring which is co-axial with the ring for preselection of the diaphragm, axially displaceably and to provide it with a groove which is adapted to be engaged in one of its end positions by a coupling pin provided on the ring for the preselection of the diaphragm, whereby a connection between the two rings is brought about. In the other end position of the shutter time adjusting ring, the coupling pin is removed from the groove so that the two adjusting rings can be adjusted independently from each other. The axially displaceable shutter time adjusting ring is thereby preferably under the effect of a spring preferably arranged in such a manner that the spring constantly keeps the two rings either in coupled position or in uncoupled position. The uncoupling or coupling is then effected by displacement of the adjusting ring against said spring effect. It is, of course, possible to use in this arrangement the ring for preselection of the diaphragm, as the axially displaceable element.

The appended drawings illustrate by way of example a specific embodiment of and a best mode for carrying out the invention, to which the invention is not limited.

Figure 1:
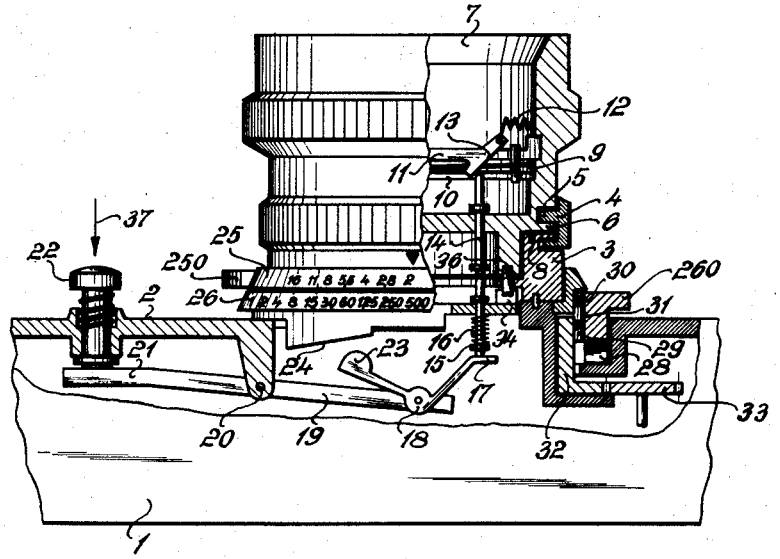
Fig. 1 illustrates in top view, partially in section, an objective fastened to the camera body.
Figure 2:
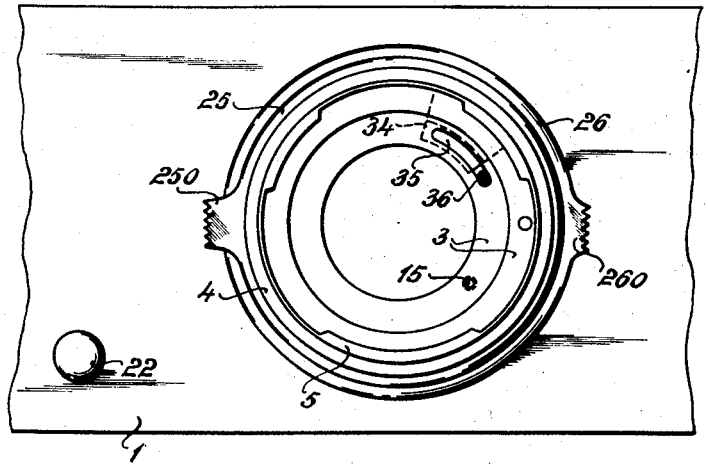
Fig. 2 is the front view of the camera casing shown in Fig. 1, the objective being removed in this figure.

Referring now to the drawings in detail, reference numeral 1 denotes a camera casing, to the wall 2 of which a tubular member 3 is fastened. A screw collar ring 4 is held and rotatably guided in said member 3. Ring 4 is provided with several bayonet flaps 5 adapted to engage corresponding flaps 6 provided on the mount 7 of an exchangeable objective, which can be thus connected with and firmly seated in member 3, i.e. with the camera body. Fastened to mount 7 is a pin 8 or the like, for which a bore is provided in the front surface of tubular member 3, so that objective mount 7 can be fastened to member 3 only if pin 8 enters said bore.

An iris diaphragm is built-in in mount 7. The diaphragm lamellae, of which only one is shown and denoted 9 in the drawing, are arranged, on the one hand, on a ring 10 which is not displaceable and, on the other hand, on a ring 11 for adjustment of the lamellae. Said ring 11 is engaged by a draw spring 12 which draws it to a position in which the iris diaphragm is fully open. Furthermore, on ring 11 an inclined surface 13 is provided and a diaphragm adjusting pin 14, which is axially displaceable in objective mount 7, lies against said surface 13. Upon attachment of an objective to the camera casing 1, this diaphragm adjusting pin 14 comes in connection with a scanning or feeler pin 15 which is axially displaceable in camera casing 1. Said pin 15 is caused by a spring 16 to engage an arm 17 of a feeler lever 18, which is tiltably arranged on a lever 19. Said lever 19 is rotatable about a bolt 20 or the like, fastened in the wall of camera casing 1 and lies with its arm 21 against a shutter release key 22 arranged in the camera front wall 2. In the range of movement of arm 23 of scanning member 18 a control cam 24 is arranged, which is located on ring 25 for preselection of the diaphragm, said ring 25 being rotatably arranged about member 3 and provided with a scale of diaphragm values. The handling member of said ring 25 is denoted 250. Co-axially relative to ring 25, a shutter time adjusting ring 26 provided with an adjusting handle member 260, is arranged in the casing wall. This ring 26 is axially displaceable against the effect of a leaf spring 28 bent in circular shape and it has a groove 29 extending parallel to its axis, said groove being adapted to be engaged by one of several coupling pins 30 provided on ring 25 for preselection of the diaphragm. Furthermore, a coupling pin 31 engages said groove 29, said pin 31 being fastened to a setting ring 32, which is connected over an intermediate gear 33 with the shutter adjusting member (not shown in the drawing) of a focal-plane shutter. In the position illustrated in Fig. 1, both coupling pins 30 and 31 engage groove 29 so that ring 25 for preselection of the diaphragm is rigidly coupled with ring 26 for adjustment of the shutter time. Upon displacing shutter time adjusting ring 26 against the effect of leaf spring 28, coupling pin 30 is disengaged from groove 29 so that ring 25 for preselection of the diaphragm and ring 26 for adjustment of the shutter times are adjustable relative to each other. Another coupling pin 30 can then be caused to engage groove 29 so that ring 25 and ring 26 will be coupled with each other at another exposure value. The number of coupling pins 30 provided on ring 25 is at least equal to the number of available exposure values. However, additional pins 30 can be provided so that intermediate exposure values can also be adjusted.

Fastened to ring 25 is also a flap 34, into the range of movement of which an arcuate slat 35 provided in the front wall of tubular member 3 is introduced. This slot 35 receives a stop pin 36 provided on objective mount 7 and projecting then into the range of movement of flap 34 on ring 25. The stop pins 36 are provided on the mount of each exchangeable objective in such position that they limit the range of movement of ring 25 to a preselected diaphragm value corresponding to the strength of illumination of the respective exchangeable objective. Thus, ring 25 can be always adjusted to a preselected diaphragm value only, to which the diaphragm of the exchangeable objective to be attached to the camera is in fact adjustable. Simultaneously, attachment of an exchangeable objective is prevented if ring 25 is adjusted to a preselected diaphragm value, to which the diaphragm of the respective exchangeable objective cannot be adjusted. In such a case, stop pin 36 on mount 7 would come in contact with flap 34. Therefore, it is necessary to adjust ring 25 to another diaphragm value —to which the diaphragm of the respective exchangeable objective is adjustable—in order to render attachment of such objective possible.

The device for preselection of the diaphragm operates as follows:

In Fig. 1 ring 25 is adjusted to diaphragm value "2," which corresponds to the strength of illumination of exchangeable objective just attached to the camera. Upon actuation of shutter release key 22 in the direction of arrow 37, lever 19 will be tilted about bolt 20. Simultaneously, scanning or feeler lever 18, which lies with its arm 17 against feeler pin 15, is tilted, but without displacement of pin 15. At the end of movement of the shutter release key 22, at which the camera shutter is released in conventional manner, arm 23 of lever 18 just comes in engagement with control cam 24 of ring 25. Thus, during this actuation of the shutter release key 22, the diaphragm is not adjusted, and remains open at the preselected, largest possible diaphragm value "2." After adjustment of ring 25 to another diaphragm value, upon actuation of shutter release key 22, arm 23 of lever 18 will, earlier or later, come in contact with control cam 24. It will then engage the latter and will exert pressure—upon further movement of shutter release key 22—by its arm 17 on pin 15 and cause displacement of the latter. Pin 15 will in turn cause displacement of diaphragm adjusting pin 14, which exerts pressure on inclined surface 13 of lamellae adjusting ring 11 and thereby causes turning of this ring so that the iris diaphragm starts to close. At the end of the movement of shutter release key 22, i.e. at the moment when the shutter is released, the iris diaphragm will be closed to the extent corresponding to the preselected value. After release of key 22, the members causing adjustment of the diaphragm return to the initial position shown in the drawing, so that the iris diaphragm will be fully reopened.

It will be understood from the above that this invention is not limited to the specific construction, arrangements, designs, stops and other details specifically described above and illustrated in the drawings and can be carried out with various modifications without departing from the scope of the invention as defined in the appended claims.

What is claimed is:

1. In a one-eye photographic reflex camera constructed and arranged to have interchangeably mounted thereon objectives each having a built-in diaphragm; a device, for preselecting diaphragm values, built-in in the camera body and comprising, in combination, power transmission members, for connecting said device with an objective diaphragm arranged on the mount of the objective, and said members extending and acting substantially in the direction of the optical axis; a shutter ring for adjustment of shutter time values; an adjusting handle member included in said device in the form of a second ring coaxial with said shutter ring and with the optical axis, said shutter ring and said second ring being constructed and arranged for coupling together for adjustment of exposure values; a control cam on said second ring; a feeler member adapted to engage said control cam to adjust the diaphragm through said transmission members; a shutter release key; means controlled by said shutter release key and operable, only during actuation of the latter, to effect engagement of said control cam by said feeler member; said last named means comprising a first two-armed lever pivoted about a stationary pivot and being adapted to be moved about said pivot by action of the shutter release key on one arm of said first lever; the feeler member consisting of a second two-armed lever tiltably fastened to the other arm of said first lever, whereby the control cam provided on the ring for preselection of the diaphragm value is in the range of movement of a first arm of said second lever; the body of the camera comprising an axially displaceably arranged feeler pin included in said transmission members; the objective mount comprising an axially displaceably arranged diaphragm adjusting pin, a first end of which is engaged by an adjacent end of said feeler pin, while the other end of the latter is engaged by the second arm of said second lever; the second end of said diaphragm adjusting pin being adapted to engage an inclined surface provided on a ring for setting the lamellae of the diaphragm.

2. A reflex camera as claimed in claim 1, comprising a flap provided on the ring for preselection of the diaphragm value, said flap being adapted to cooperate with a stop member provided on said second exchangeable objective to be attached to the camera, in order to limit the range of movement of said second ring for preselection of diaphragm values, to those diaphragm values, to which the diaphragm of said exchangeable objective is adjustable.

3. A reflex camera as claimed in claim 2 in which said shutter time adjusting ring is axially displaceably arranged and provided with a groove; a coupling pin provided on said diaphragm preselection ring and adapted to engage, in a first end position, said groove in order to bring about coupling between the shutter time adjusting ring and the diaphragm preselection ring; said coupling pin being adapted, in its other end position, to disengage said groove in order to uncouple the shutter time adjusting ring and diaphragm preselection ring.

4. A reflex camera as claimed in claim 3, comprising a spring for urging the shutter time adjusting ring to its coupled position with the diaphragm preselection ring.

5. One-eye photographic reflex camera comprising a camera housing constructed and arranged to have interchangeably mounted thereon, coaxial with the optical axis thereof, objectives each having a diaphragm arranged therein; a shutter release key permanently mounted on said housing; a shutter-speed setting ring permanently rotatably mounted on said housing coaxially of said optical axis; a diaphragm pre-selector ring permanently rotatably mounted on said housing coaxially with said setting ring and carrying a diaphragm scale; disengageable coupling means for said setting and pre-selector rings; a cam on said pre-selector ring extending into said housing; a feeler device permanently supported in said housing and operatively associated with said key for movement, upon actuation of said key, into engagement with said cam; a diaphragm arranged in each interchangeable objective; a diaphragm setting device including a first component in said housing coupled to said feeler device and movable by the latter when said feeler device engages said cam, and a second component within each interchangeable objective; said components being movable parallel to said optical axis and being aligned in engagement with each other when the objective is mounted on said housing; a diaphragm setting ring rotatably supported in each objective and coupled to the diaphragm therein; and spring means in each objective biasing the diaphragm setting ring to the fully open position of the diaphragm; said diaphragm setting ring having a cam surface engaged by said second component; whereby, upon actuation of said key, said feeler device engages said cam to move said components parallel to the optical axis to operate the diaphragm setting ring through said cam surface to a position determined by the setting of said pre-selector ring.

References Cited in the file of this patent

UNITED STATES PATENTS

| | | |
|---|---|---|
| 1,468,091 | Thalhammer | Sept. 18, 1923 |
| 1,521,780 | Maski | Jan. 6, 1925 |
| 2,080,274 | Huenger | May 11, 1937 |
| 2,273,386 | Steiner | Feb. 17, 1942 |
| 2,803,182 | Werner | Aug. 20, 1957 |

FOREIGN PATENTS

| | | |
|---|---|---|
| 278,965 | Switzerland | Feb. 16, 1952 |
| 726,693 | Germany | Oct. 19, 1942 |
| 891,187 | Germany | Sept. 24, 1953 |